May 5, 1925.
D. JORDAN
TRACTOR HITCH
Filed May 11, 1923
1,536,102
2 Sheets-Sheet 1
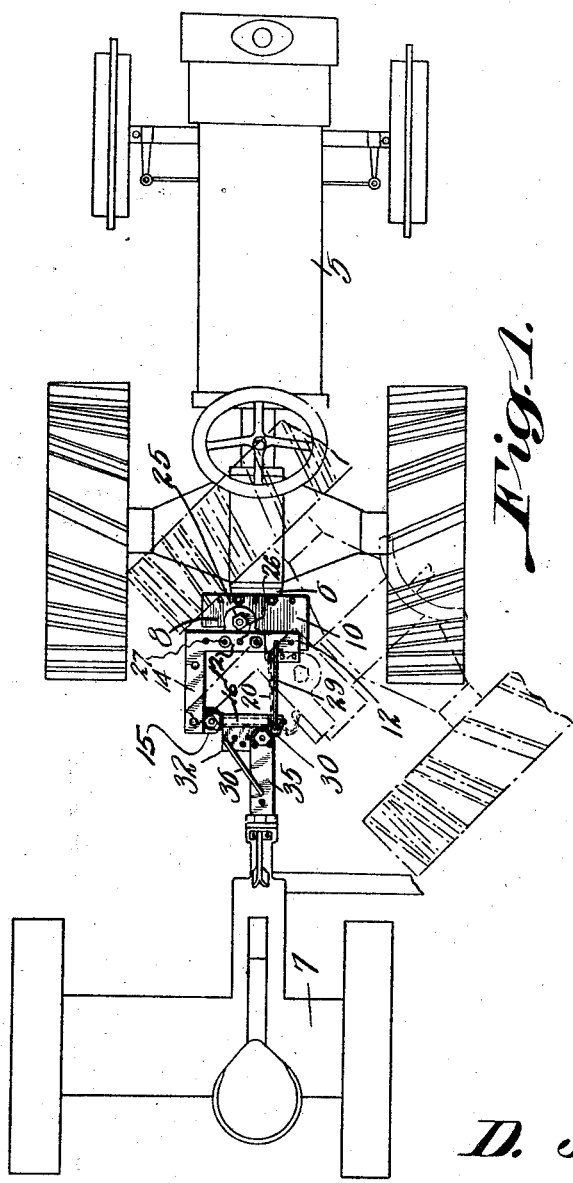
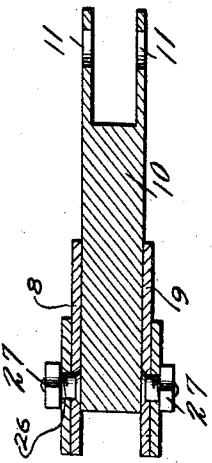
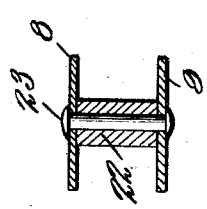
D. Jordan, Inventor
By C. A. Snow & Co.
Attorney May 5, 1925.

D. JORDAN 1,536,102

TRACTOR HITCH

Filed May 11, 1923

D. Jordan, Inventor

By C. A. Snow & Co.

Attorney

Patented May 5, 1925.

1,536,102

UNITED STATES PATENT OFFICE.

DANIEL JORDAN, OF HARRISON, NEBRASKA.

TRACTOR HITCH.

Application filed May 11, 1923. Serial No. 638,305.

*To all whom it may concern:*

Be it known that I, DANIEL JORDAN, a citizen of the United States, residing at Harrison, in the county of Sioux and State of Nebraska, have invented a new and useful Tractor Hitch, of which the following is a specification.

This invention relates to a tractor hitch and more particularly to a hitch employed for connecting a train of agricultural machines, the primary object of the invention being to provide a novel form of hitch whereby the machines having connection with a tractor will execute a right angled turn at the corner of a field.

Another object of the invention is to provide a device of this character which may be locked against movement should it be desired to use the hitch for straight-away hauling.

A still further object of the invention is to provide a hitch which may be readily and easily secured to a tractor or the like eliminating the necessity of making alterations in the usual construction to apply the hitch.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view disclosing a tractor supplied with a hitch constructed in accordance with the invention.

Figure 2 is a sectional view taken on line 2—2 of Figure 4.

Figure 3 is a sectional view taken on line 3—3 of Figure 4.

Figure 4:
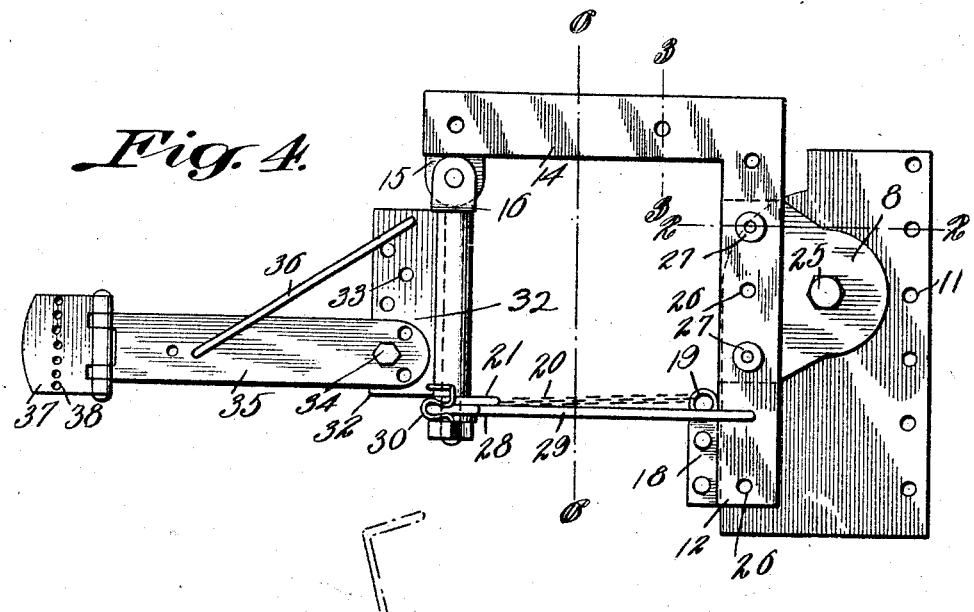
Figure 4 is an enlarged plan view of the hitch.

Referring to the drawings in detail, the reference character 5 designates a conventional form of tractor which is supplied with the usual hitching bar 6 at the rear thereof.

The reference character 7 indicates an agricultural machine drawn by the tractor, The hitch includes a pair of plates 8 and 9 held in spaced relation by means of the bar 10 which extends throughout the lengths of the plates. This bar 10 is of a thickness less than the width of the space between the plates 8 and 9 and is formed with a cut out portion to provide a clearance for the reception of the hitching bar 6 of the tractor, suitable openings 11 being provided to accommodate suitable securing bolts not shown, that may be employed for securing the hitching bar to the hitch. Thus it will be seen that the plates may have connection with the hitching bar 6 at various points throughout the lengths of the plates.

Having connection with the plates 8 and 9, are the hitching bars 12 and 13 which have rearwardly extended right angled portions 14 that are formed with integral ears 15 (see Figure 4) extending in parallel relation with the bars 12 and 13, where they have pivotal connection with the rod 16 that also normally lies in parallel relation with the bars 12 and 13.

The bars 12 and 13 have rearwardly extended flanges 17 to which is secured the plate 18 formed with an eye 19, at one end thereof, the eye being designed to accommodate an end link of the chain 20 which also has connection with the rod 16 at 21.

The bars 12 and 13, are disposed on opposite sides of the plates 8 and 9 and are thus held in spaced relation with each other, while the right angled portions thereof, are held in spaced relation by means of the spacing tube 22 (see Figure 5) which has its ends contacting with the right angled portions 14 and held in position by means of the bolt 23.

In order that the plates 8 and 9 may be adjusted longitudinally of the bars 11 and 12, openings 26 are formed in the bars, which openings may accommodate the bolts 27 that secure the plates 8 and 9 to the bars 12 and 13. Pivotally connected with the rod 16 at 28, is a rod 29 that has a right angled forward end designed to be positioned in an opening of the bars 12 and 13, whereby pivotal movement of the hitch bars with respect to the rod 16, will be prevented, should it be desired to use the hitch for straight-away hauling.

Figure 5:
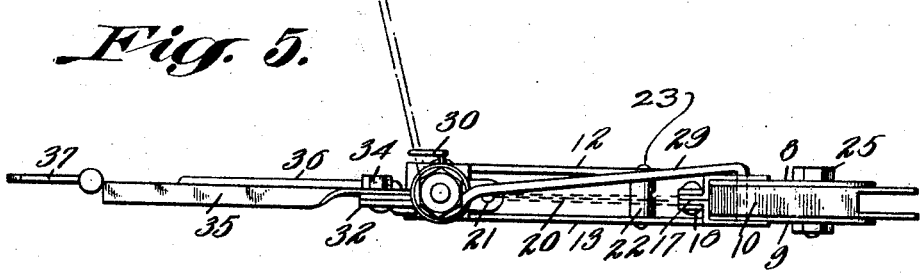
Figure 5 is a side elevational view thereof.
Figure 6:
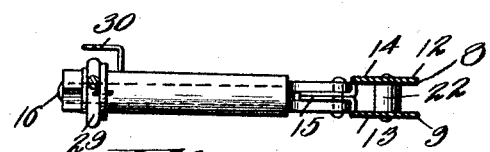
Figure 6 is a sectional view taken on line 6—6 of Figure 4.

Supported above the rod 29 is a bracket 30 adapted to receive the arm 28 when the same is moved to its inactive position, or a position as shown in dotted lines in Figure 5 of the drawings, whereupon the hitching bars, as well as the forward portion of the hitch may swing with respect to the rear portion of the hitch to accomplish the purpose of the invention.

Hitching plates indicated at 32 are mounted on the rod 16 and formed with a plurality of openings 33 to accommodate the bolt 34 to permit the bar 35 to be adjusted longitudinally of the plates 32, rod 36 being provided and having connection with the plates 32 and bar 35 to hold the bar 35 against pivotal movement.

Hingedly connected with the bar 35, is a connecting plate 37 formed with a plurality of openings 38 which have connection with the agricultural machine in the usual and well known manner.

From the foregoing it will be seen that when the rod 29 is in a position as illustrated in dotted lines in Figure 5 of the drawings, and the tractor 5 is moved to a position as shown in dotted lines in Figure 1 of the drawings, the machines which are connected by the hitch will continue forwardly and define a square corner in their path of travel to insure the machine contacting with the entire surface over which the machine is moving.

Having thus described the invention, what is claimed as new is:—

A tractor hitch including a forward section and a rear section, a rod pivotally supported by the rear sections and having its ends disposed laterally of the rear section, a pair of hitching bars forming a part of the forward section, said hitching bars having rearwardly extending portions formed with ears, means for pivotally connecting the rod and ears of the rearwardly extended portions, a rod pivotally supported on the first mentioned rod and having a right angled end, said hitching bars having openings, and said right angled portion adapted to be positioned in the opening to restrict movement of the sections with respect to each other.

In testimony that I claim the foregoing as my own, I have hereto affixed my signature in the presence of two witnesses.

DANIEL JORDAN.

Witnesses:
 JOHN T. COFFEE,
 MORITZ N. WILHERMSDORFER.